US010337539B1

(12) United States Patent
Shah

(10) Patent No.: US 10,337,539 B1
(45) Date of Patent: Jul. 2, 2019

(54) DRAG REDUCTION AND ENERGY GENERATION APPARATUS AND METHOD FOR TRANSPORT VEHICLES

(71) Applicant: Naseem Z Shah, Scottsdale, AZ (US)

(72) Inventor: Naseem Z Shah, Scottsdale, AZ (US)

( * ) Notice: Subject to any disclaimer, the term of this patent is extended or adjusted under 35 U.S.C. 154(b) by 0 days.

(21) Appl. No.: 16/175,396

(22) Filed: Oct. 30, 2018

Related U.S. Application Data

(63) Continuation-in-part of application No. 15/837,076, filed on Dec. 11, 2017, now abandoned.

(51) Int. Cl.
| | |
|---|---|
| *F15D 1/00* | (2006.01) |
| *B60L 8/00* | (2006.01) |
| *B62D 35/00* | (2006.01) |
| *H05H 1/24* | (2006.01) |

(52) U.S. Cl.
CPC ............ *F15D 1/0075* (2013.01); *B60L 8/003* (2013.01); *B62D 35/00* (2013.01); *H05H 1/2406* (2013.01); *B60Y 2400/216* (2013.01); *H05H 2001/2412* (2013.01)

(58) Field of Classification Search
CPC ...... F15D 1/0075; B60L 8/003; H05H 1/2406; H05H 2001/2412; B62D 35/00; B60Y 2400/216

See application file for complete search history.

(56) References Cited

U.S. PATENT DOCUMENTS

| | | | |
|---|---|---|---|
| 2006/0185974 A1* | 8/2006 | Putnam | ............... H05H 1/2406 204/252 |
| 2010/0090497 A1* | 4/2010 | Beckon | ............... B60Q 1/2661 296/180.5 |

* cited by examiner

*Primary Examiner* — D Glenn Dayoan
*Assistant Examiner* — Melissa A Black
(74) *Attorney, Agent, or Firm* — Continuum Law; Robert P. Cogan

(57) ABSTRACT

An apparatus and system provide drag reduction and energy efficiency for a transport vehicle. Cover sections of transport vehicles are formed to include solar panels comprising photovoltaic cells and dielectric barrier discharge plasma actuator arrays. The vehicle cover also generates electricity to charge onboard battery racks. The cover sections are integral with and shaped to conform with areas such as a trunk lid or roof. Fiber Bragg grating sensors are placed to detect formation of a separation layer. Plasma actuator arrays are actuated either to inhibit formation of the separation layer or to create span-wise waves to reduce skin drag.

20 Claims, 11 Drawing Sheets

DRAG REDUCTION AND ENERGY GENERATION APPARATUS AND METHOD FOR TRANSPORT VEHICLES

CROSS REFERENCE TO RELATED APPLICATIONS

This is a continuation-in-part of U.S. patent application Ser. No. 15/837,076, filed Dec. 11, 2017.

FIELD OF TECHNOLOGY

The present technology relates generally to a transport vehicle cover that reduces aerodynamic drag by utilizing a real time closed loop feedback control system for inhibiting flow separation based on Fiber Bragg grating (FBG) sensors and Dielectric-barrier-discharge (DBD) plasma actuators. The vehicle cover also generates electricity using solar energy to charge the onboard battery racks utilizing concealed solar arrays embedded with multi junction photovoltaic cells to augment its primary source of energy.

BACKGROUND

The United States Energy Information Administration has released data showing that the transportation of people and goods accounts for about 25 percent of all energy consumption in the world and that passenger transportation, in particular light-duty vehicles, account for the most transportation energy consumption. The share of transport in world energy consumption is expected to increase to 30 percent by 2040.

Self-generation of energy by transport vehicles using solar energy will reduce transport's foot print in the consumption of world energy. Another major drain on energy utilization in transport vehicles is aerodynamic drag. Depending on the geometry of a vehicle, aerodynamic drag may account for as high as 60% of its energy consumption. Reduction in aerodynamic drag would significantly reduce the environmental footprint of transport vehicles and result in major cost and environmental benefits due to reduced fuel consumption.

Prior art arrangements have been provided for reducing drag for an object comprising a vehicle of a given shape. A few of such type of arrangements include creating a plasma between a surface on the object and an area of laminar flow above the object.

Historically, plasma actuators have had very limited success in flow control due to a number of factors. The structure for any given drag-reducing unit based on traditional plasma actuators does not allow for seamless integration in a number of vehicle geometries. None of the prior art uses sensors to judge flow separation in a transport vehicle in real time. Neither do these take into account the most fundamental contributing factors to aerodynamic drag including vehicle speed, atmospheric temperature, coefficient of drag, Reynolds number, relative humidity, surface area of the transport vehicle, air pressure, and its reduction based on any one or more of these parameters. For example, it was determined that the creation of plasma on the surface of transport vehicles at low speeds, e.g., less than 25 mph, increased drag for most transport vehicle geometries. However, almost all prior art supports the activation of plasma actuators as soon as the vehicle starts moving.

DBD plasma actuators have a high electrical energy consumption that overrides the saved power from the skin-friction drag reduction. However, if an efficient design of DBD plasma actuators is used, then substantial power saving is achievable. Prior art has not been able to specify that efficient design as yet.

Active flow control technologies have not yet been adopted in controlling aerodynamic drag essentially due to the disorderly nonlinear nature of the key physical processes and because of the difficulty in monitoring or estimating the chaotic flow status and parameters accurately, resulting in a very challenging optimal control problem. Many other factors regarding deployment of actuators for drag reduction have not been considered by the prior art.

The ability of traditional plasma actuators in flow control at highway speeds is practically non-existent. Successful demonstration of vehicular drag reduction using plasma actuators at highway speeds has as yet not been reported.

U.S. Pat. No. 9,951,800 discloses a surface plasma actuator having a conducting wire attached to a surface of a target object and electrically insulated from the target object. Surface plasma is generated adjacent to the conducting wire by applying a pulse voltage to the conducting wire. This arrangement is particularly suited to the vanes in gas turbines. The wire structure is not suited for incorporation in transport vehicles.

U.S. Pat. No. 9,821,862 discloses a system, for controlling aerodynamics of a vehicle comprising multiple pairs of opposing plasma actuators positioned at lateral positions on an underside of the vehicle, wherein each pair of opposing plasma actuators comprises two electrodes. The plasma actuator may be configured as a small strip, similar in thickness to a strip of aluminum foil, having or connected to a glue layer for easy attachment to a transport vehicle body, and then connected to a power source. The plasma actuator is not interacting with another body component integral with the shape of a vehicle.

United States Published Patent Application No. 20180065690 discloses a plasma actuator including a first electrode disposed on a substrate, covered by a dielectric layer, and a second electrode disposed on the dielectric layer. The plasma actuator creates a plasma region, altering air flowing over the actuator. A particular structure for reducing drag is not shown.

Prior art arrangements have also been provided for directing electric current generated by photovoltaic cells to the transport vehicle. Most of these are restricted to the roof or part of the roof of the vehicle while some other structures do not blend seamlessly into the shape of the vehicle and increase aerodynamic drag. Also, the photovoltaic cells in most of these structures are single cell with a maximum theoretical efficiency of about only 33%. The solar arrays in prior art are not concealed and do not blend-in with the rest of the surface of the vehicle and early adoption was inhibited because of aesthetic reasons.

U.S. Pat. No. 6,517,148 B1 discloses a solar cover for a motor vehicle for the roof only with a transparent cover.

U.S. Pat. No. 6,474,729 B2 discloses a solar cover for a motor vehicle for the roof only with a carrier plate with a plurality of photovoltaic cells and a cover plate.

U.S. Pat. No. 6,337,436 B1 discloses a solar module for mounting on motor vehicles, which is provided with a top cover layer and a bottom cover layer, between which a solar generator is embedded which has plurality of electrically interconnected photovoltaic cells.

U.S. Pat. No. 5,545,261 discloses solar roof for motor vehicles with a solar generator having photovoltaic cells for supplying power to a power consumer and/or a battery and with a DC converter for impedance matching between the solar generator and the consumer and/or battery.

U.S. Pat. No. 5,154,481 discloses a vehicle roof with at least one cover that, alternatively, closes or at least partially opens an opening in a fixed roof surface of the vehicle, carries a solar power source for supplying power to at least one power consuming device.

U.S. Pat. No. 6,155,636 discloses a solar roof for motor vehicles having a cover with photovoltaic cells which are located between an outside cover plate and inside covering, at least one power consumer which is separate from the solar cover.

SUMMARY

An apparatus and a method are provided in a transport vehicle cover which reduces energy consumption through significant reduction in aerodynamic drag. The vehicle cover also generates solar energy to augment other sources of energy as fuel for the vehicle. The vehicle cover has the shape that conforms to the exterior parts of the vehicle. It either completely replaces the respective part or mates with and overlaps it thereby retaining the original form, shape, and contour of the vehicle. For aesthetic reasons, the vehicle cover conceals every element embedded in it so that it does not stand out from the rest of the vehicle. More than one drag-reducing panel may be integrated into various sections of a transport vehicle body. Single or combinations of drag-reducing panels may be activated to provide various drag reduction results.

Fiber Bragg grating (FBG) sensors, surface dielectric barrier discharge (DBD) plasma actuators, and solar arrays based on multi junction photo-voltaic cells, are embedded in the vehicle cover at pre-determined locations based on the geometry of the transport vehicle. The operation of the drag-reducing panel is based on an adaptive, predictive, real time closed loop feedback control system. Data from the fiber Bragg grating (FBG) sensors is used to judge flow separation in real time. This information is used to activate the DBD plasma actuators to induce tangential jets to delay flow separation, thereby reducing pressure drag. The plasma actuator is activated at an unsteady actuator frequency that is determined based on the speed of the transport vehicle and the distance of the actuator electrode from the trailing edge of the vehicle. Output from the fiber Bragg grating (FBG) sensors is used in the selection of a DBD plasma actuator or a group of DBD actuators that are to be activated for optimizing drag reduction.

Another group of DBD actuators is embedded in the vehicle cover and is configured to generate span wise travelling waves to reduce skin-friction drag whenever the vehicle speed exceeds a pre-determined threshold.

The embedded solar arrays in the vehicle cover charges the vehicle whenever these are exposed to natural sunlight or incandescent light. The solar arrays, the DBD plasma actuators and the fiber Bragg grating (FBG) sensors do not share the same space on the vehicle cover.

It has been determined that activation of DBD plasma actuators at speeds less than 25 mph increases drag for most transport vehicle geometries. The system is, thus, preferably programmed to function only when the vehicle speed exceeds a predetermined threshold.

It is noted, the use of the DBD plasma actuators is not essential with respect to reducing drag under all conditions.

DETAILED DESCRIPTION

Figure 1:
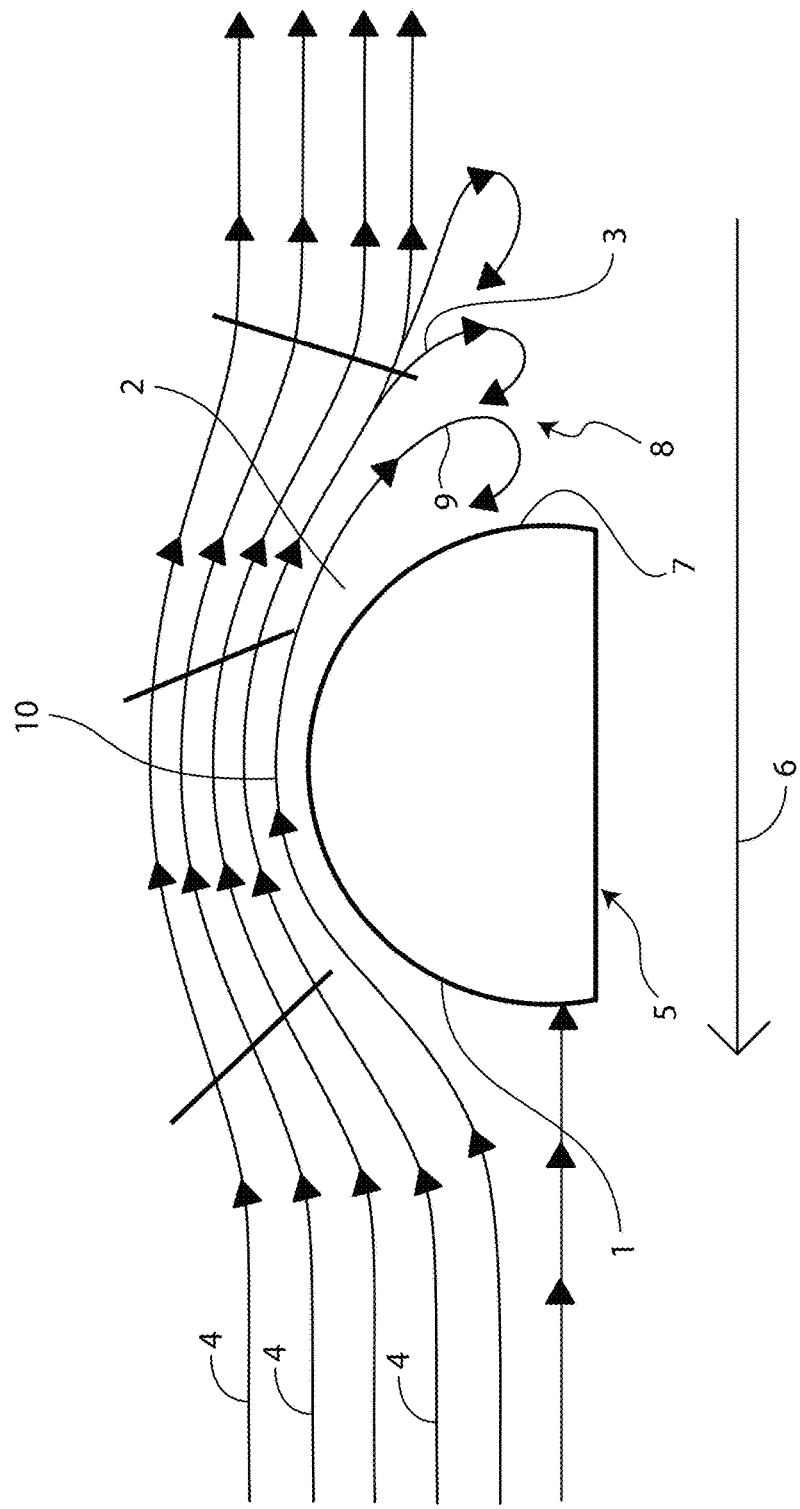
FIG. 1 is a diagram illustrating an example of the phenomenon of aerodynamic drag.

The world is currently not on track to meet the main energy-related components of the Sustainable Development Goals (SDGs), agreed by 193 countries in 2015. The International Energy Agency's (WA) Sustainable Development Scenario (SDS) outlines a major transformation of the global energy system, showing how the world can change course to deliver on the three main energy-related SDGs simultaneously.

These include a growing electrification of energy systems fueled by rapidly decreasing costs, deployment of clean energy technologies, and the halving of energy-related CO2 emissions by 2040.

Transport vehicles which reduce energy consumption through drag reduction and generate solar energy to augment other sources of energy for fuel at the same time hold the key in the achievement of LEA's Sustainable Development Goals (SDGs).

A general description of the phenomenon of drag is presented first. Drag refers to forces that oppose the relative motion of an object through a fluid, for example air.

Drag depends on the transport vehicle speed, air density, size, shape, and geometry of the body, and its surface area. One way to deal with such complex interrelated dependencies is by distinguishing the dependence by a single variable called the drag coefficient, represented as "Cd." This allows expression of all the factors into a single equation.

$$D = Cd * A * 0.5 * r * V^2 \qquad (1)$$

where:
D=Drag
Cd=Drag coefficient
r=Air Density
V=Velocity
A=Surface Area

Drag coefficient is mostly determined experimentally using a wind tunnel. The average modern transport vehicle achieves a drag coefficient of between 0.25 and 0.3. For a given shape, drag coefficient is substantially fixed. Air density is a function of air pressure, temperature, and relative humidity. Reynolds number is a dimensionless quantity that can help predict flow patterns in different fluid flow situations. At low Reynolds numbers, flows tend to be dominated by laminar sheet-like flow, while at high Reynolds numbers turbulence results from differences in the fluid's speed and direction, which may move against the overall direction of the flow. These are called eddy currents and use up energy in the process.

A key component of the present subject matter is the string-type surface DBD plasma actuator. It can be used very effectively in manipulating the air flow over any surface. The string-type DBD plasma actuator is used in the present embodiments and can be designed to follow the shape of any thermodynamic body. It is mounted in a recess in the surface of the vehicle cover to which it is applied; essentially flush to the surface. It uses very low energy and generates non-thermal plasma which may be used over temperature sensitive surfaces to enable significant boundary layer modifications. Boundary layer modifications can effectively prevent flow separation reducing aerodynamic drag. It can also reduce skin-friction drag by oscillating the flow in span wise direction. DBD plasma actuators exhibit low weight, non-moving parts, and when switched off have a non-existent aerodynamic signature. DBD actuators may be positioned over aerodynamic surfaces in span-wise and stream-wise directions. In the former, the induced body force is in the same direction as the incoming flow. Span-wise oscillation is one of the most effective techniques in wall turbulence control, with as much as 45% reduction in skin-friction drag. In the latter, induced thrust is perpendicular to the free stream direction. In this case, the composition of these two flows produces vorticities propagating in the downstream direction.

The plasma actuators in the specific embodiments within this application preferably use ±24 volts DC. 12 volts DC which is available in most transport vehicles is converted to ±24 volts DC by using a standard DC 12V to DC 24V step-up converter. From a health and safety perspective, voltage is applied to an encapsulated electrode and the exposed electrode is grounded. Additional insulation is inserted to enable use of the actuators on metallic structures. Another key component of the present embodiment is the fiber Bragg grating (FBG) sensor. FBG sensors are preferred for this application due to their miniature size, high sensitivity, higher accuracy, longer stability, corrosion resistance, wide operational range, multiplexing capabilities, immunity to electrical and magnetic fields, and the ability to measure ultra-highspeed events. It is a type of distributed Bragg reflector constructed in a short segment of optical fiber that reflects particular wavelengths of light and transmits all others. This is achieved by creating a periodic variation in the refractive index of the fiber core, which generates a wavelength-specific dielectric mirror. It reflects a wavelength of light that shifts in response to variations in temperature and/or strain.

In the present example the FBG sensor is attached to the interior surface near the base of a cantilever beam on the pressure surface of a symmetrical airfoil installed at a trailing edge of the transport vehicle to judge flow separation in real time. When a cantilever tip is vibrated by the flow near the trailing edge of the symmetrical airfoil, the strain at a cantilever base is reflected in the form of Bragg wavelengths detected by the FBG sensor. The sensor calculates flow separation in real time by calculating running standard deviations in the Bragg wavelength detected by it.

Two of the design objectives of the present subject matter are:

1. to enable transport vehicles to significantly reduce energy consumption through the reduction of aerodynamic and friction drag; and
2. to enable transport vehicles to generate solar energy to augment other sources of energy.

In one embodiment an apparatus and a method are provided. The present embodiment comprises a transport vehicle cover that reduces aerodynamic drag by utilizing an adaptive, predictive, real time closed loop feedback control system for inhibiting flow separation based on fiber Bragg grating (FBG) sensors and dielectric barrier discharge (DBD) plasma actuators. The vehicle cover also generates electricity using solar energy to charge the onboard battery racks utilizing concealed solar arrays embedded with multi junction photovoltaic cells to augment its primary source of energy. The vehicle cover has a shape that conforms to the exterior parts of the transport vehicle, so that it either completely replaces the respective part or mates with and overlaps it, thereby retaining the original form, shape, and contour of the vehicle.

More than one drag-reducing panel may be integrated into various sections of a transport vehicle body. Single or combinations of drag-reducing panels may be activated to provide various drag reduction results.

Fiber Bragg grating (FBG) sensors were selected for the current embodiments for judging flow separation in real time. The rationale for the selection of the FBG sensors for the present embodiments was that these are completely immune against electromagnetic interference and run without electric power at the measurement site. The FBG sensors exhibit high corrosion and humidity resistance, show good long-term signal stability, have the fastest response times, and are very sensitive to strain.

Fiber Bragg grating (FBG) sensor is a microstructure that is photo-inscribed in the core of a single-mode optical fiber (SMF). This is done by crosswise illumination of the fiber with a UV laser beam and using a phase mask to generate an interference pattern in its core. This brings about a permanent change in physical characteristics of a silica matrix. This change comprises a spatial periodic modulation of the core index of refraction that creates a resonant structure.

An FBG has unique characteristics to perform as a strain sensor. For example, when the fiber is stretched or compressed, the FBG will measure strain. This happens because the deformation of the optical fiber leads to a change in the period of the microstructure and of the Bragg wavelength.

Fiber Bragg grating (FBG) sensors, surface dielectric barrier discharge (DBD) plasma actuators and solar arrays based on multi junction photovoltaic cells, are embedded in the vehicle cover at pre-determined locations based on the geometry of the transport vehicle. The operation of the drag-reducing panel is based on a real time closed loop feedback control system. Data from the fiber Bragg grating (FBG) sensors embedded in the symmetrical airfoil installed at the trailing edge of the transport vehicle is used to sense flow separation in real time. This information is used to activate the DBD plasma actuators to induce tangential jets to delay flow separation, thereby reducing drag. Output from the fiber Bragg grating (FBG) sensors is used in the selection of a DBD plasma actuator or a group of DBD actuators that are to be activated for optimizing drag reduction.

The embedded, concealed solar arrays in the vehicle cover charge the vehicle when exposed to natural sunlight or incandescent light. The solar arrays, the DBD plasma actuators, and the fiber Bragg grating (FBG) sensors do not share the same space on the vehicle cover.

It has been determined in accordance with the current subject matter that activation of DBD plasma actuators at speeds less than 25 mph increases drag for most transport vehicle geometries. The system may be programmed to function only when the vehicle speed exceeds a predetermined threshold, for example 25 mph.

The present subject matter is described in sufficient detail below with reference to the diagrams so that any person of ordinary skill in the pertinent art could make and use the invention without extensive experimentation. The best mode contemplated of carrying out the invention has also been set forth. Each element in the drawings has been mentioned in the description below.

Aerodynamic drag refers to forces that oppose relative motion of an object through a fluid, for example air. Drag depends on air density; velocity of the object, air's compressibility and viscosity, size, shape, and geometry of the object and roughness of the object's surface. For transport vehicles aerodynamic drag has two major components, pressure drag and skin friction drag.

FIG. 1 is a diagram illustrating an example of the phenomenon of aerodynamic drag. Pressure drag is caused by the air particles being more compressed on the front-facing surface 1 of a moving object 5, moving in a "forward" direction 6. Laminar air flow layers 4 pass over the moving object 5. An air flow layer 4 adjacent to an upper surface of the moving object 5 is a boundary layer 10. The layers 4 are more widely spaced behind a back surface 7 of the moving object 5. Flow separation layer 2 which is behind the back surface 7 creates a low-pressure area 3 in a wake 8 with eddy currents 9 having a high kinetic energy. This low-pressure area 3 and the eddy currents 9 create a suction effect that tends to pull the moving object 5 backwards. The force produced by the suction effect is called pressure drag and is a key component of aerodynamic drag. If formation of the flow separation layer 2 is inhibited by any means it reduces the area of low pressure in the wake 8 and inhibits the creation of pressure drag. Skin friction drag is caused by the friction of a fluid against a surface of an object that is moving through it. It is directly proportional to an area of the surface in contact with the fluid and increases with the square of the velocity. The present subject matter inhibits formation of the separation layer at highway speeds and disables the actuator when the actuator could increase drag at slow speeds below a particular threshold level.

Figure 2:
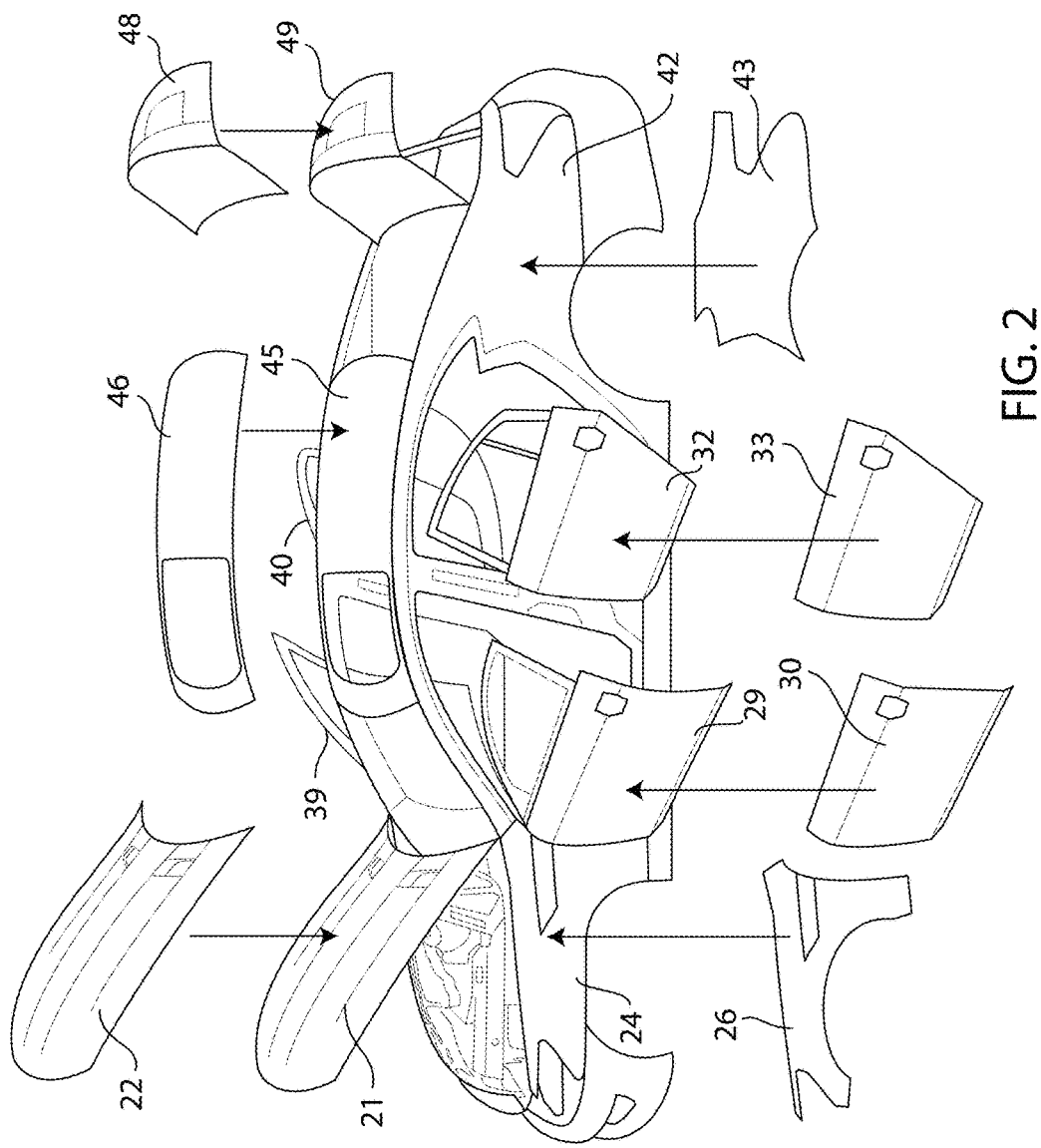
FIG. 2 is an exploded view of an exemplary transport vehicle illustrating vehicle cover components.

FIG. 2 is an exploded view of an exemplary transport vehicle illustrating vehicle cover components. Aerodynamic drag is reduced by placement of drag-reducing solar panels in body components. An exemplary set of drag reducing solar panels is articulated below. The drag reducing solar panel conceals the solar panel embedded in it through a reinforced colored glass top, the photovoltaic cell array of matching color, and a light absorbing back sheet of matching color. The drag reducing solar panel may either completely replace the respective original exterior part of the vehicle or the respective body component is formed with a recess to receive a drag-reducing solar panel. One or more drag-reducing solar panels will comprise a plasma actuator array located adjacent a position at which an undesired separation layer may be formed.

For example, a hood 21 receives a panel 22. A driver's side front quarter panel 24 receives a panel 26. Driver's side front and rear doors 29 and 32 receive panels 30 and 33 respectively. Passenger side front and rear doors 39 and 40 have corresponding recesses to those on the driver's side doors. Therefore, the panels 30 and 33 are illustrative of the panels in the doors 39 and 40. Similarly, a driver side rear quarter panel 42 receives a panel 43. The panel 43 is also illustrative of a panel received in a passenger side rear quarter panel. The roof 45 receives a panel 46. Panel 48 is received in the trunk cover 49. A front passenger side quarter panel has a recess which receives a panel represented by the panel 26.

Figure 11:
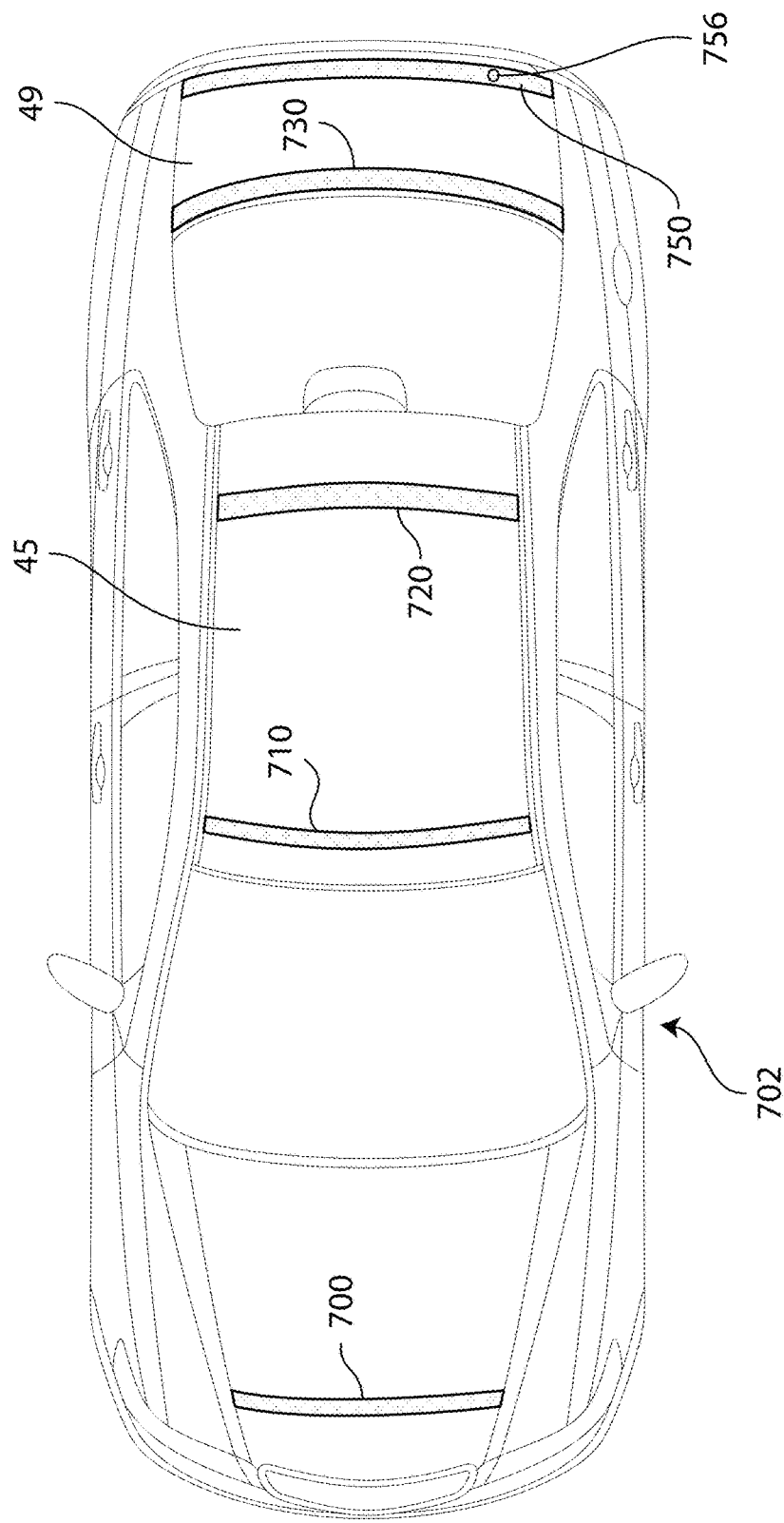
FIG. 11 is a diagram illustrating an exemplary transport vehicle in which arrays of plasma actuators are operated in accordance with the flow chart of FIG. 10.

As further described with respect to FIG. 11, Fiber Bragg grating (FBG) sensors, surface dielectric barrier discharge (DBD) plasma actuators, and solar arrays based on multi junction photovoltaic cells, are embedded in the vehicle cover at predetermined locations based on the geometry of the transport vehicle. The operation of the drag-reducing panel is based on an adaptive, predictive, real time closed loop feedback control system. Data from the fiber Bragg grating (FBG) sensors is used to judge flow separation in real time. This information is used to activate the DBD plasma actuators to induce tangential jets to delay flow separation, thereby reducing pressure drag. The plasma actuator is activated at an unsteady actuator frequency that is determined based on the speed of the transport vehicle and the distance of the actuator electrode from the trailing edge of the vehicle. Output from the fiber Bragg grating (FBG) sensors is used in the selection of a DBD plasma actuator or a group of DBD actuators that are to be activated for optimizing drag reduction.

Another group of DBD actuators are embedded in the vehicle cover and are configured to generate span wise travelling waves to reduce skin-friction drag whenever the vehicle speed exceeds a predetermined threshold.

The embedded solar arrays in the vehicle cover charges the vehicle whenever these are exposed to natural sunlight or incandescent light. The solar arrays, the DBD plasma actuators, and the fiber Bragg grating (FBG) sensors do not share the same space on the vehicle cover.

Figure 3:
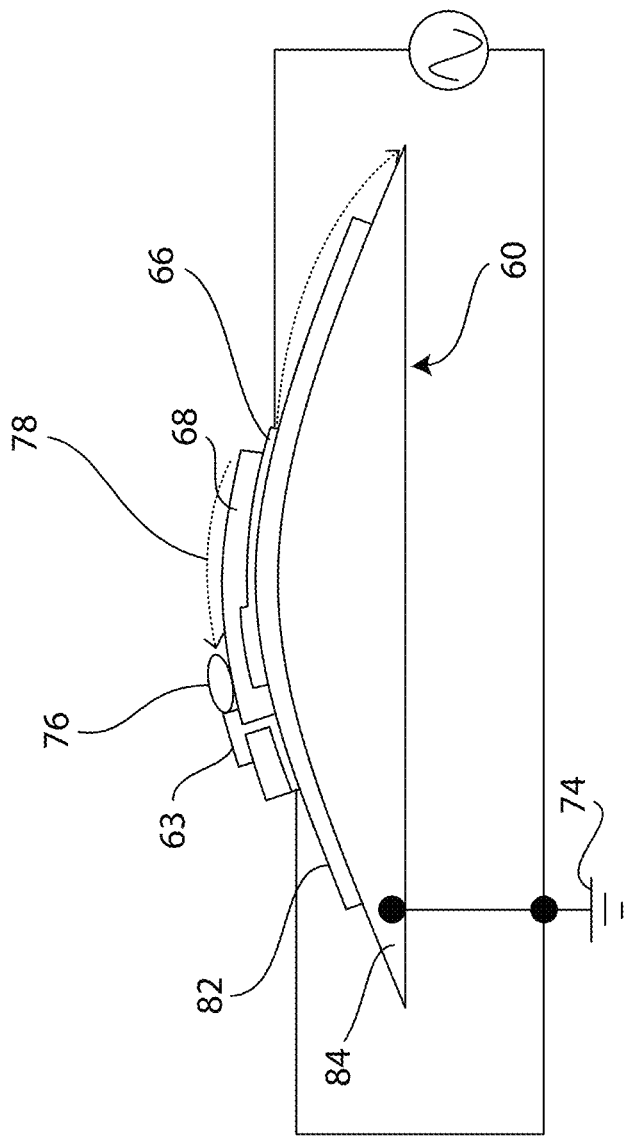
FIG. 3 is a schematic diagram of a string-type surface dielectric barrier discharge (DBD) plasma actuator.

FIG. 3 is a schematic diagram of a string-type surface dielectric barrier discharge (DBD) plasma actuator 60. It is mounted in a recess in a surface of one of the vehicle cover components illustrated in FIG. 2, essentially flush to the surface. Each actuator 60 can be effectively used in the manipulation of a boundary layer, e.g., boundary layer 10 of FIG. 1. A boundary layer is a thin layer located close to a wall of an object traveling through a fluid. Successful control of this region allows for significant drag reduction.

The string-type DBD plasma actuators 60 embedded in the drag reducing solar panel of the present embodiment (FIG. 5) comprise two electrodes 63 and 66 offset in the chordwise direction and separated by a dielectric layer 68. The encapsulated electrode 63 is connected to a level of reference potential, namely ground 74. The exposed electrode 66 is attached to a voltage supply. The plasma actuators 60 in the present embodiment use ±24 volts DC. When activated, plasma originates at the exposed electrode 66 and spreads out across a dielectric surface 76 that is above the encapsulated electrode 63. This arrangement induces a tangential jet 78 with a strong horizontal velocity component that flows away from the exposed electrode 66 across the encapsulated electrode 63, without the support of any moving parts.

The system sits atop an insulation layer 82 with a metallic blade 84 at the bottom. The DBD actuator 60 is able to follow the curvature of the surface it is applied to, is lightweight, can be switched on or off by an electronic control unit (ECU), is all-electric, can be activated at a wide range of modulation frequencies, and has a high frequency response. In order to save energy the actuator 60 in the current embodiment is operated in unsteady mode. The actuator 60 is switched on and off at a particular modulation frequency. The energy consumption in unsteady mode operation is less than 12 watts per meter. The frequency can range from 5 kHz to 75 kHz. The voltage can range from 5 $kV_{pp}$ to 18 $kV_{pp}$.

The string-type DBD plasma actuator 60 used for the control of pressure drag in the current embodiment is activated at an unsteady actuator frequency that is equal to the vehicle speed in meters per second divided by the distance in meters of the plasma actuator 60 electrode from the trailing edge of the transport vehicle.

Figure 4:
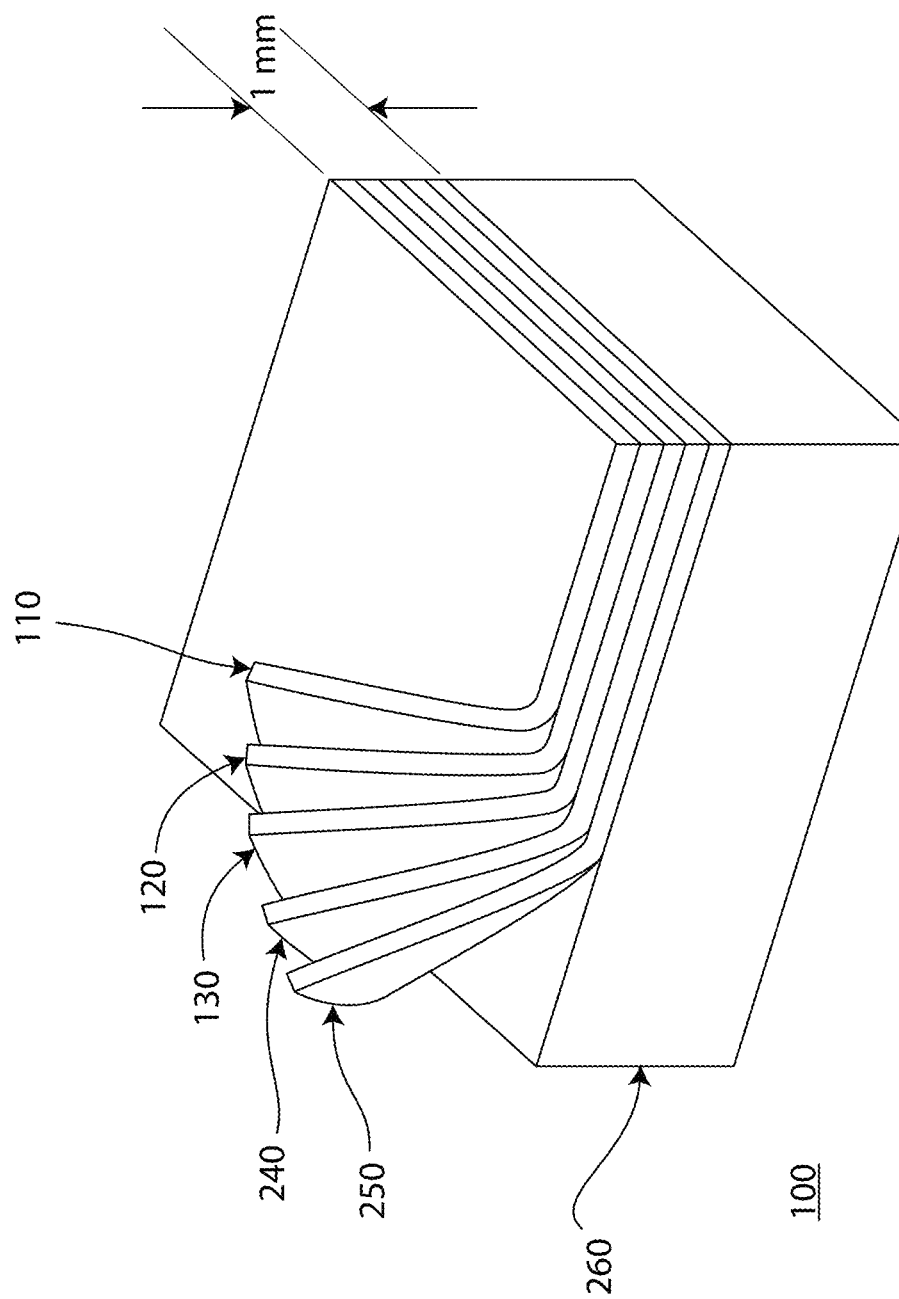
FIG. 4 is an isometric view of a multi junction photovoltaic cell showing successive layers partially pulled back.
Figure 5:
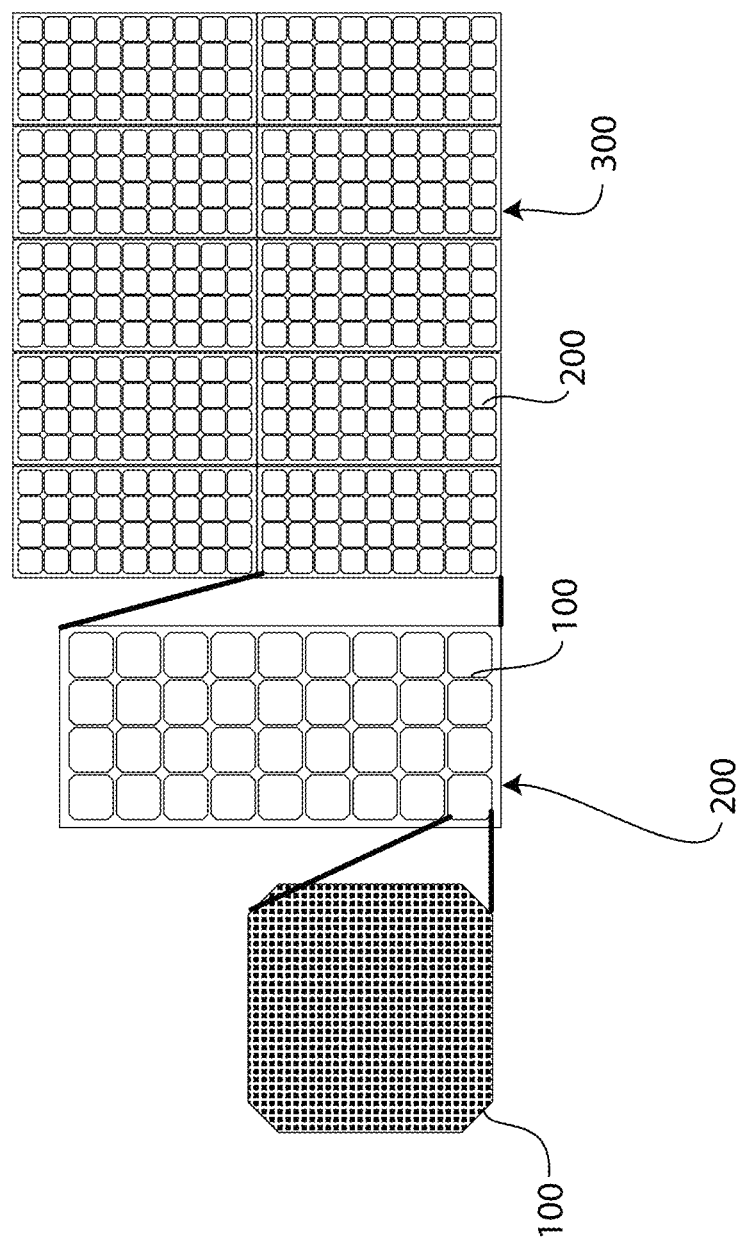
FIG. 5 is a is a plan view of a multi junction photovoltaic cell, the placement of the cell in a module with multiple multi junction photovoltaic cells, and the placement of the module in a solar array.

FIG. 4 is an isometric view of a multi junction photovoltaic cell 100 showing successive layers partially pulled back. Each multi junction cell 100 is made-up of multiple layers, each layer capturing a portion of the sunlight reaching the cell. This allows the cell to absorb light from a wide range of the solar spectrum, leading to better efficiency. A multi junction photovoltaic cell is a stack of individual single-junction cells in descending order of bandgap. The top cell layer 110 captures light with the shortest wavelengths having the highest energies and passes the rest of the photons on to be absorbed by lower-bandgap cells 120 and 130. Multi junction cells are arranged in a series configuration to form a module 200 (FIG. 5) and modules 200 are then connected in parallel-series configurations to form arrays 300 (FIG. 5). A layer 240 is an n type silicon layer. Layer 250 is a p type silicon layer. The layer 240 and the layer 250 provide a p-n junction. A backing layer 260 insulates the cell 100.

FIG. 5 is a is a plan view of a multi junction photovoltaic cell 100, the placement of the cell 100 in a module 200 with multiple multi junction photovoltaic cells, and the placement of the module 200 in a solar array 300.

Figure 6:
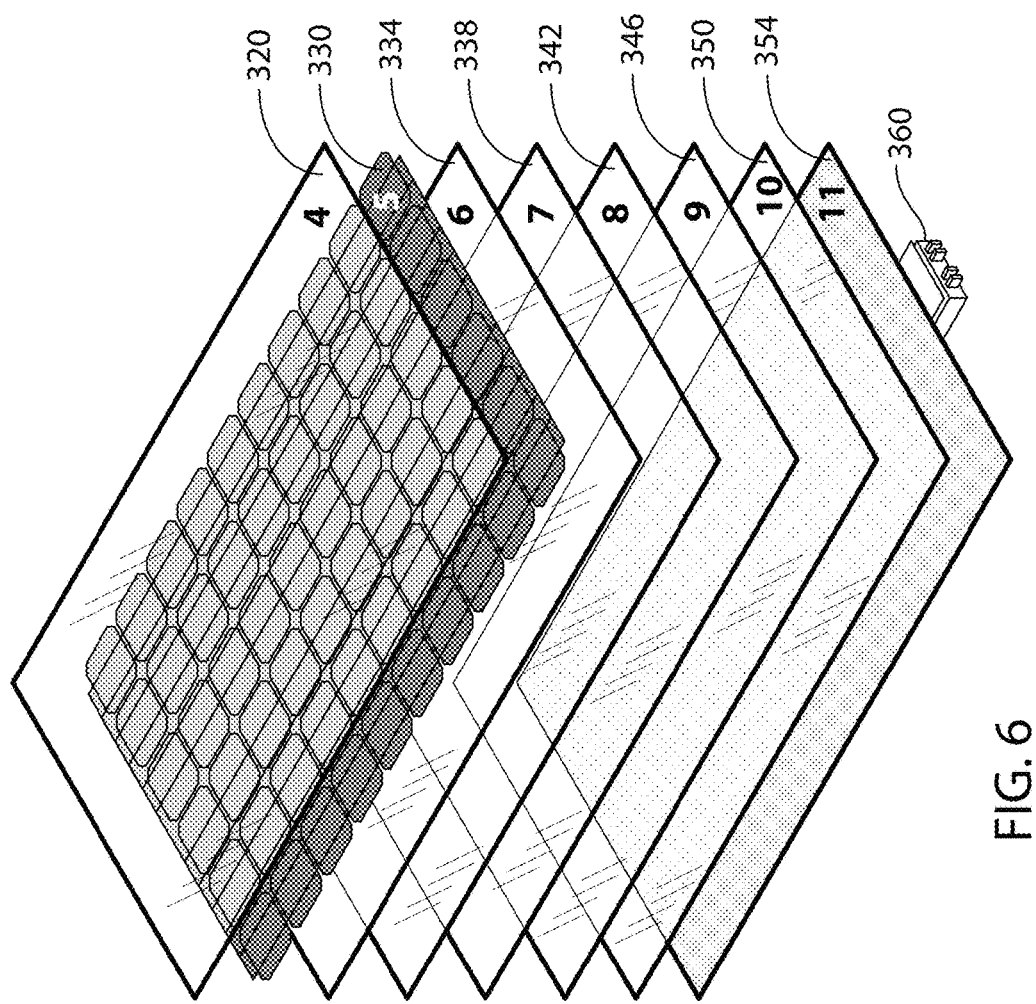
FIG. 6 is a diagram illustrating an exploded view of layers of a vehicle cover having the solar array embedded in it.

FIG. 6 is a diagram illustrating an exploded view of layers of a vehicle cover having the solar array 300 embedded in it. The vehicle cover conceals the elements of the solar panel embedded in it through a colored reinforced glass top 320. The photovoltaic layer 330 comprises a plurality of multi junction photovoltaic cells 100 (FIG. 4). Layer 334 is an encapsulant. Layer 338 is a substrate. Layer 342 is a cover film. Layer 346 is the seal. Layer 350 is the gasket. Layer 354 is the back sheet. Connection to the power system is provided by a DC connector 360. The reinforced glass top sheet 320, the photovoltaic layer comprising plurality of multi junction photovoltaic cells 330, and the back sheet 354 all have the same color as that of the vehicle to ensure that the solar energy generation components within the vehicle cover remain concealed and do not stand out from the rest of the vehicle.

Figure 7:
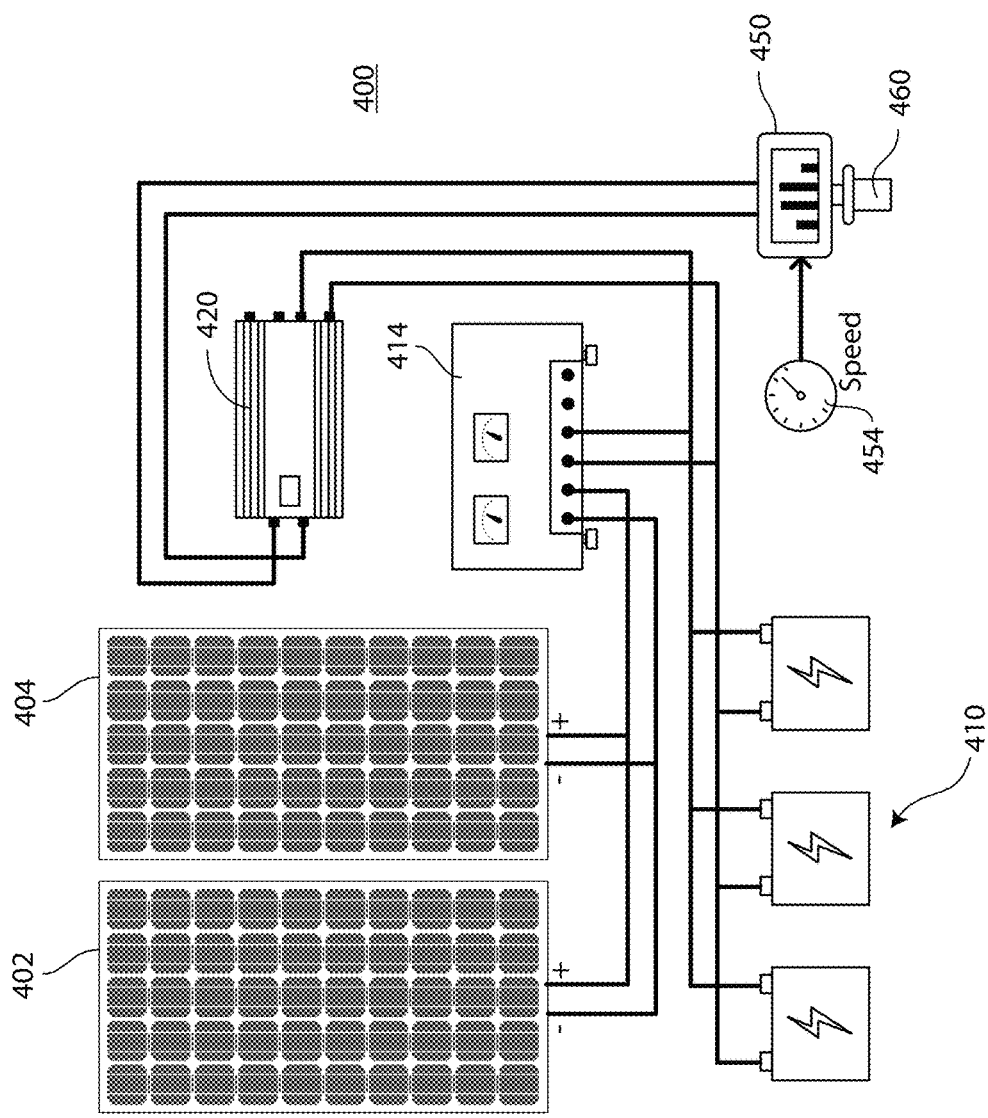
FIG. 7 is a schematic diagram of the electronic circuit including connectivity between elements of a solar energy generation system.

FIG. 7 is a schematic diagram of the electronic circuit 400 including connectivity between elements of a solar energy generation system. First and second solar arrays 402 and 404 generate DC electricity which is routed to an on-board battery rack 410 through the DC combiner box 414. A standard DC 12V to DC 24V step-up converter 420 is used to convert 12 V DC to ±24 V DC which is routed to a drag-reducing closed loop system 460 through an electronic control module (ECM) 450. The drag-reducing closed loop system 460 is actuated as soon as it receives input from a speed sensor 454 indicating that the vehicle's ground speed has exceeded a predetermined threshold below which drag will be increased, for example 25 mph. The speed sensor 454 includes but is not limited to a speedometer, pitot static tubes, anemometry, or laser doppler. These sensors give an electronic signal that can be read by the electronic control module (ECM) 450.

Figure 8:
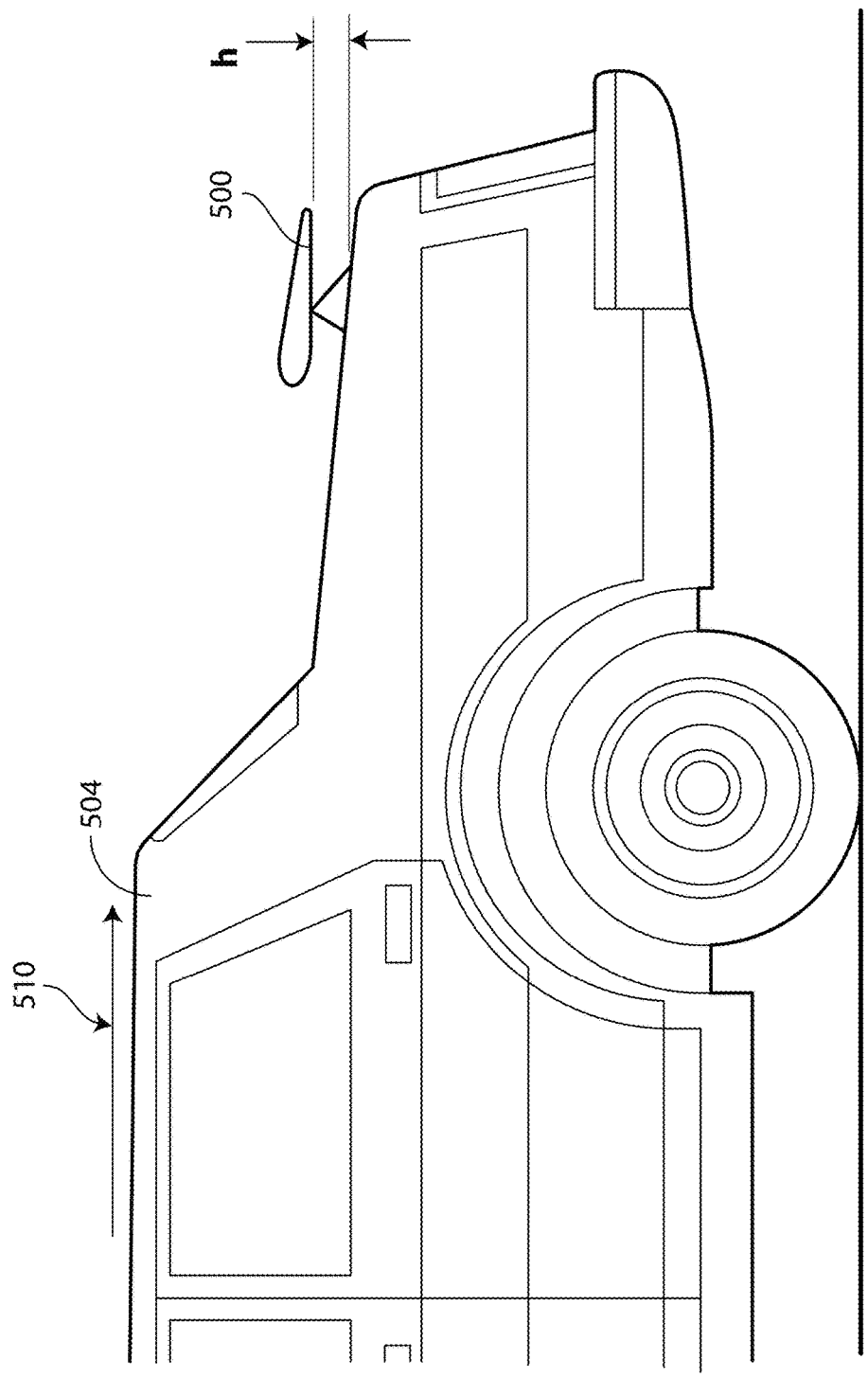
FIG. 8 is a diagram illustrating a symmetrical airfoil installed at a trailing edge of the transport vehicle.

FIG. 8 is a diagram illustrating a symmetrical airfoil 500 installed at a trailing edge of a transport vehicle 504 and used for inhibiting formation of a separation layer. A vertical distance h of the symmetrical airfoil 500 from the surface of the vehicle 504 is less than the thickness of a laminar boundary layer 510 for the respective vehicle geometry calculated using the Blasius solution for laminar boundary layers over a flat plate. The distance h of the symmetrical airfoil 500 from the surface is less than the thickness of the boundary layer 510 calculated for the respective vehicle geometry and may vary between 0.5 inches to 2 inches for most vehicle geometries. The objective is to keep the symmetrical airfoil 500 just within the boundary layer 510 for laminar flow.

Figure 9:
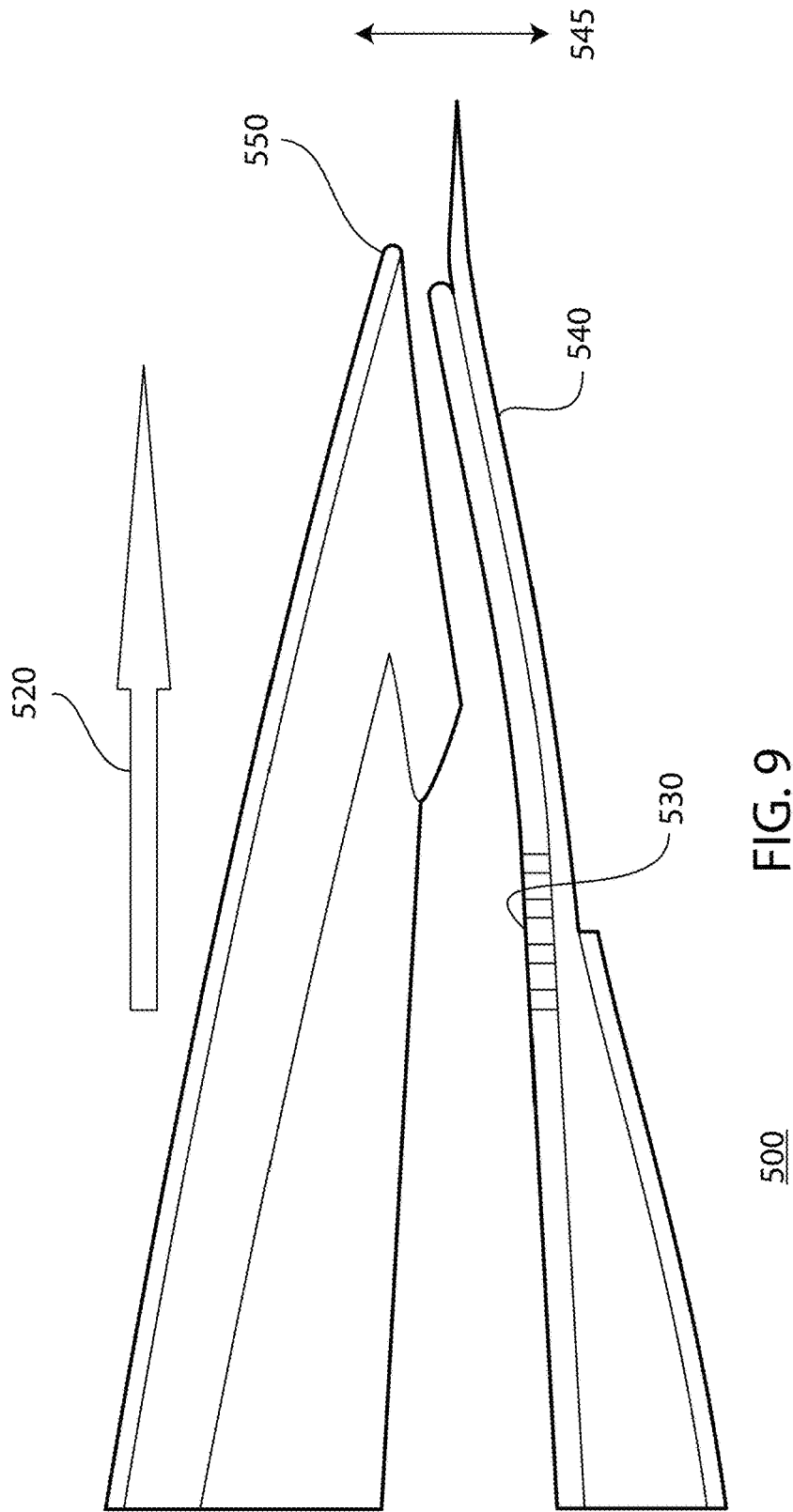
FIG. 9 is a diagram illustrating a cross section of the symmetrical airfoil installed at the trailing edge of the transport vehicle.

FIG. 9 is a diagram illustrating a cross section of the symmetrical airfoil 500 installed at the trailing edge of the transport vehicle 504. The arrow 520 represents the direction of air flow when the vehicle 504 is moving forward. An FBG strain measurement system comprising an FBG sensor 530, which can precisely detect minute elastic deformation of an optical fiber, is attached to the interior surface near the base of a cantilever beam modeled on a pressure surface of the symmetrical airfoil 500. In order to realize a fiber Bragg strain sensor, strain from the substrate needs to be fully transferred to the fiber Bragg grating. Therefore, the sensor 530 is tightly bonded onto the surface and the substrate strain is completely guided to the fiber. The strain at the cantilever root is reflected in the form of Bragg wavelengths detected by the FBG sensor 530 when the cantilever tip 540 is vibrated by the flow 545 near the trailing edge 550 of the symmetrical airfoil 500.

The range of values for the strain reflected in the FBG sensor 530 when the symmetrical airfoil 500 is moving within the laminar boundary layer 510 is derived from the respective vehicle geometry in a wind tunnel simulation. Similarly, when a vehicle is in motion, flow separation is confirmed when the cantilever tip 540 stops vibrating by the flow 545 near the trailing edge of the symmetrical airfoil 500. This range of values of the FBG sensor 530 is also determined in a wind tunnel and noted for the respective vehicle geometry These values are used in the real time closed loop feedback control system 460 (FIG. 7) to determine when flow separation occurs and when it is mitigated by the induction of tangential flow by the DBD plasma actuators as illustrated in the flowchart in FIG. 10.

Figure 10:
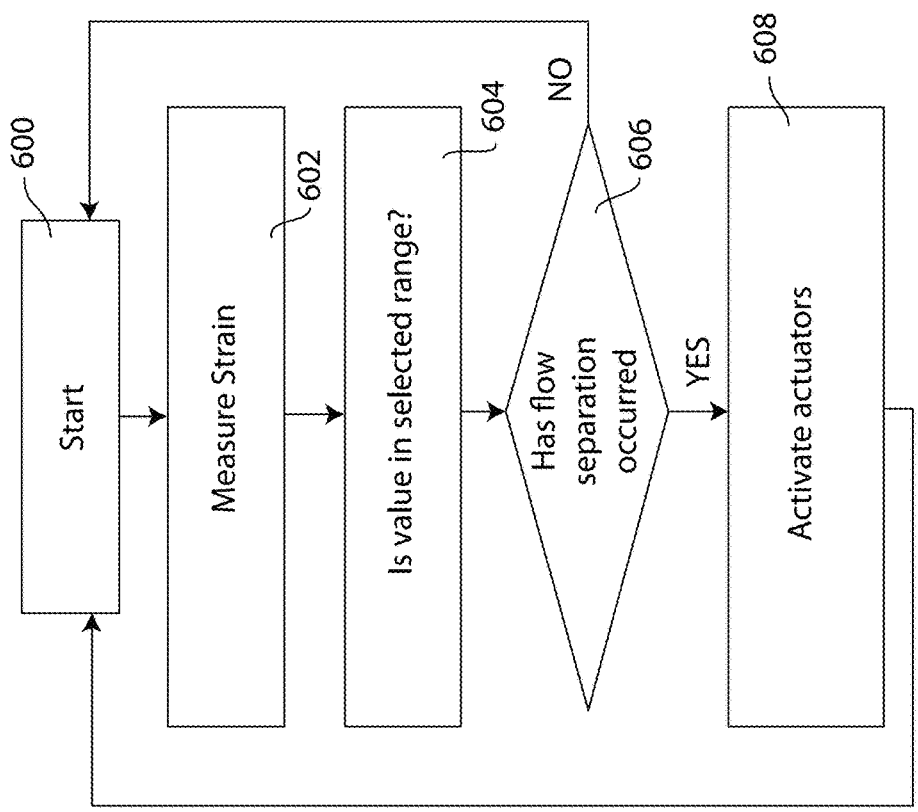
FIG. 10 is a flow chart for the closed loop control of flow separation in response to transport vehicle speed.

FIG. 10 is a flow chart for the closed loop control of flow separation in response to transport vehicle speed. This operation inhibits actuation of plasma actuator arrays until a vehicle reaches a speed at which drag will be reduced. An on-board electronic control module (ECM) 450 (FIG. 7) controls the working of the closed loop feed control system 460 and executes activities and makes decisions as shown in FIG. 10.

Operation begins at block 600. At block 602 the output of the FBG sensor 530 (FIG. 9) is measured to determine strain. An FBG strain measurement comprises precisely detecting minute elastic deformation of an optical fiber attached to the interior surface near the base of the cantilever beam 540 (FIG. 9) modeled on the pressure surface of the symmetrical airfoil 500 installed at the trailing edge of the transport vehicle 510.

At block 604 the strain measurement is compared to determine if the strain value falls within a preselected range of values. Being within the preselected range of values indicates that the cantilever tip 540 substantially stops vibrating in response to the air flow 545. This condition indicates flow separation from the symmetrical airfoil 500, confirming flow separation. At block 606 the determination is made whether flow separation has occurred. If so, operation proceeds to block 608. If not, operation returns to block 600. At block 608 activation of the embedded string-type DBD plasma actuators is initiated to induce tangential plasma jets to inhibit flow separation, thereby reducing pressure drag. Operation cycles in order to continuously monitor presence or absence of the separation layer. The operation comprises an adaptive, predictive, real time closed loop method for controlling aerodynamic drag.

FIG. 11 is a diagram illustrating an exemplary transport vehicle in which arrays of plasma actuators are operated in accordance with the flow chart of FIG. 10. An array 700 is an array of string-type DBD plasma actuators 60 (FIG. 3) embedded in the frontside of the hood 21 (FIG. 2) of the vehicle. Since flow separation is not required to be mitigated on the hood of the car these are designed to generate span-wise travelling waves to reduce skin friction drag.

In a transport vehicle 702, an array 710 of string-type DBD plasma actuators 60 (FIG. 3) is embedded in the frontside of the roof 45 of the vehicle. Since flow separation is not required to be mitigated in the frontside of the roof 45 of the vehicle, these are configured to generate span-wise travelling waves to reduce skin friction drag.

It is noted that arrays 700 and 710 are activated when speed of the vehicle exceeds a predetermined threshold, for example 25 mph, and deactivated when the speed drops below that threshold. These are not part of the adaptive, predictive, real time closed loop feedback control system 460 of the present embodiment.

Array 720 and array 730 are each an array of string-type DBD plasma actuators 60 embedded in rear end of the roof 45 and front end of the trunk 49 of the vehicle, respectively. These two arrays induce tangential plasma jets to inhibit flow separation. These are part of the adaptive, predictive, real time closed loop feedback control system 460 for drag reduction and operate in accordance with FIG. 10. These arrays are activated when the vehicle speed exceeds a predetermined threshold, for example 25 mph. This speed is indicated when the FBG sensor 530 embedded in the symmetrical airfoil 500 and installed at the trailing edge of the vehicle determines that flow separation has occurred.

Airfoil 750 is a symmetrical airfoil installed at a trailing edge of the transport vehicle 702 with the FBG sensor 756 embedded in it. These arrays are activated at a frequency equal to the speed of the vehicle in meters per second divided by the distance from the actuator 60 electrode to the trailing edge of the vehicle in meters. The onboard electronic control module (ECM) 450 (FIG. 7) controls the working of the closed loop feed control system 460 and executes activities and makes decisions in compliance with FIG. 10.

All the remaining surface of the vehicle excluding the front windshield, rear windshield, and windows are embedded with concealed solar arrays.

The present embodiment will enable cars, trucks, and trains to generate their own power through solar energy. The product will also enable these vehicles to reduce aerodynamic drag thereby increasing their range and lowering their fuel consumption by as much as 40%. A formula determines the optimum frequency of the actuators based on their distance from the trailing edge of the vehicle as well as the speed of the vehicle to maximize drag reduction.

In the foregoing detailed description, the apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The invention claimed is:

1. Apparatus for reducing drag in a transport vehicle comprising:
   a cover component formed to be integral with an exterior surface section of said transport vehicle;
   at least one photovoltaic array formed in said cover component disposed in registration with an area of said exterior surface;
   a first dielectric discharge barrier plasma actuator positioned in said cover component for providing a plasma jet over the exterior surface of said transport vehicle when actuated;
   said photovoltaic array and said dielectric discharge barrier plasma actuator having terminals for being interconnected through an electrical system of said transport vehicle; and
   a switching circuit and a sensor for actuating said dielectric discharge barrier plasma actuator in response to a preselected set of conditions.

2. The apparatus according to claim 1 wherein said cover component comprises a solar panel, said solar panel comprising a plurality of photovoltaic arrays.

3. The apparatus according to claim 2 wherein said photovoltaic array comprises photovoltaic cells, the photovoltaic cells each having a plurality of layers, preselected layers each having a color selected to be within a selected spectral range of a color of a respective exterior surface section.

4. The apparatus according to claim 2 wherein said cover component is unitary with the exterior surface of the transport vehicle.

5. The apparatus according to claim 2 wherein said cover component comprises a discrete panel that mates with a corresponding portion of the exterior surface of said transport vehicle.

6. The apparatus according to claim 2 comprising a plasma actuator array comprising a plurality of dielectric discharge barrier plasma actuators including said first dielectric discharge barrier plasma actuator.

7. The apparatus according to claim 6 wherein said plasma actuator array is positioned to direct tangential plasma jets to inhibit flow separation from said cover component.

8. The apparatus according to claim 7 wherein said plasma actuator array comprises string-type dielectric barrier discharge actuators and in which the plasma actuator array extends across a dimension of said cover component disposed to be in a direction substantially normal to fluid flow resulting from forward motion of said transport vehicle.

9. The apparatus according to claim 6 comprising a group of DBD actuators embedded in the vehicle cover and configured to generate span-wise travelling waves to reduce skin-friction drag.

10. An adaptive, dynamic system for reducing drag and generating power in a transport vehicle comprising:
    a cover component comprising a substantially planar photovoltaic array and a dielectric barrier discharge plasma actuator array;
    said cover component being disposed at a location where a separation layer can form and said plasma actuator array being positioned in said cover component for providing a plasma jet over the exterior surface of said transport vehicle when actuated;

said photovoltaic array and said plasma actuator array having terminals for being interconnected through an electrical system of said transport vehicle;
a flow sensor positioned to respond to conditions for boundary layer separation at a trailing edge of said transport vehicle; and
a switching circuit and a sensor for actuating said dielectric discharge barrier plasma actuator in response to a preselected set of conditions.

11. The system according to claim 10 wherein said cover component corresponds to a trunk lid of said transport vehicle and wherein said flow sensor comprises a sensor responding to fluid flow at a reference position of a trailing surface at a trailing edge of the transport vehicle at a sensor height, the sensor height being less than a height of a boundary layer for laminar flow for the trailing surface.

12. The system according to claim 11 wherein the flow sensor comprises a symmetrical airfoil at the reference position and positioned at the sensor height and a fiber Bragg grating sensor attached to an interior surface of a cantilever beam, the cantilever beam having a tip mounted to respond to flow at a trailing edge of said symmetrical airfoil such that flexing of said cantilever beam substantially ceases in response to flow separation at the trailing surface.

13. The system according to claim 10 wherein said sensor further comprises a sensor sensing velocity of the transport vehicle, one condition is transport vehicle velocity, and wherein said switching circuit actuates said plasma actuator array when transport vehicle velocity exceeds a threshold level.

14. The system according to claim 12 wherein said switching circuit activates said plasma actuator array at a frequency equal to speed of a transport vehicle divided by a distance measured from the plasma actuator array to the trailing edge of the transport vehicle.

15. The system according to claim 10 in which first and second categories of cover components are provided, a first category comprising cover components at locations at which flow separation is not required to be mitigated, and a second category in which flow separation is required to mitigate pressure drag, said first category of cover components comprising plasma actuator arrays to generate span-wise traveling waves.

16. A method for reducing drag and increasing energy efficiency of a transport vehicle comprising providing a cover component at a section of an exterior surface of the transport vehicle, at which section flow separation inhibition must be provided in order to reduce aerodynamic drag, providing a solar panel in the cover component, and providing a transport vehicle electrical system comprising:
monitoring fluid flow at a location at which a wake would be indicative of aerodynamic drag;
placing a fiber Bragg grating at the location;
monitoring an output of the fiber Bragg grating and comparing the output to a range indicative of formation of the separation layer; and
actuating said plasma actuator array in response to indication of formation of the separation layer.

17. The method according to claim 16 further comprising providing an electronic control unit responding to vehicle velocity and activating said plasma actuator array at a frequency equal to speed of the transport vehicle divided by a distance measured from the plasma actuator array to a trailing edge of the cover component.

18. The method according to claim 17 in which first and second categories of cover components are provided, a first category comprising cover components at locations at which flow separation is not required to be mitigated, and a second category in which flow separation is required to mitigate pressure drag, in said first category of cover components activating a plasma actuator array to generate span-wise traveling waves.

19. The method according to claim 18 further comprising providing string-type dielectric barrier discharge actuators in said plasma actuator array.

20. The method according to claim 19 further comprising disabling said plasma actuator array in response to velocity of the transport vehicle being below a preselected threshold.

* * * * *